United States Patent [19]
Whitehead

[11] Patent Number: 5,427,507
[45] Date of Patent: Jun. 27, 1995

[54] VALVING FOR CONTROLLING A FLUID-DRIVEN RECIPROCATING APPARATUS

[75] Inventor: John C. Whitehead, Davis, Calif.

[73] Assignee: Regents of the University of California, Oakland, Calif.

[21] Appl. No.: 81,695

[22] Filed: Jun. 25, 1993

Related U.S. Application Data

[63] Continuation-in-part of Ser. No. 901,290, Jun. 19, 1992, Pat. No. 5,222,873.

[51] Int. Cl.$^6$ ............................................. F04B 35/02
[52] U.S. Cl. ............................ 417/344; 417/392; 417/426; 137/625.66; 91/189 A; 91/193
[58] Field of Search .............. 417/344, 346, 426, 392; 137/596.18, 625.66; 91/189 R, 189 A, 191, 193; 60/39.462, 39.48, 259; 92/240

[56] References Cited

U.S. PATENT DOCUMENTS

| | | | |
|---|---|---|---|
| 3,524,714 | 8/1970 | Grove et al. | 417/345 |
| 3,578,025 | 5/1971 | Furrer | 137/625.66 |
| 3,768,518 | 10/1973 | Roth et al. | 137/625.66 |
| 4,021,156 | 5/1977 | Fuchs, Jr. et al. | 417/346 |
| 4,490,096 | 12/1984 | Box | 417/342 |
| 4,541,640 | 9/1985 | Tregonning | 277/152 |
| 4,714,411 | 12/1987 | Searle | 417/246 |
| 4,722,183 | 2/1988 | Rosen | 60/204 |
| 4,894,986 | 1/1990 | Etheridge | 60/258 |
| 5,026,259 | 6/1991 | Whitehead | 417/379 |

FOREIGN PATENT DOCUMENTS 0273123  6/1970  U.S.S.R. .............................. 417/344

OTHER PUBLICATIONS

AIAA91–1837, "Free Piston Pumps For Miniature Rocket Propulsion", J. C. Whitehead, Jun. 1991.
UCRL–JC–109568, "A Lightweight Pumped Hydrazine Maneuvering Vehicle", J. C. Whitehead, Jan. 1992.

Primary Examiner—Richard A. Bertsch
Assistant Examiner—Charles G. Freay
Attorney, Agent, or Firm—Henry P. Sartorio; L. E. Carnahan

[57] ABSTRACT

A pair of control valve assemblies for alternately actuating a pair of fluid-driven free-piston devices by using fluid pressure communication therebetween. Each control valve assembly is switched by a pressure signal depending on the state of its counterpart's piston. The communication logic is arranged to provide overlap of the forward strokes of the pistons, so that at least one of the pair will always be pressurized. Thus, uninterrupted pumping of liquid is made possible from a pair of free-piston pumps. In addition, the speed and frequency of piston stroking is entirely dependent on the mechanical power load applied. In the case of a pair of pumps, this enables liquid delivery at a substantially constant pressure over the full range of flow rates, from zero to maximum flow. Each of the valve assemblies uses an intake-exhaust valve and a signal valve with the signal valve of one pump being connected to be pressure responsive to the piston of the opposite cylinder or pump.

19 Claims, 6 Drawing Sheets

VALVING FOR CONTROLLING A FLUID-DRIVEN RECIPROCATING APPARATUS

The United States Government has rights in this invention pursuant to Contract No. W-7405-ENG-48 between the United States Department of Energy and the University of California for the operation of Lawrence Livermore National Laboratory.

RELATED APPLICATION

This application is a continuation-in-part of U.S. application Ser. No. 07/901,290, filed Jun. 19, 1992, now U.S. Pat. No. 5,222,873, issued Jun. 29, 1993, and assigned to the same assignee.

BACKGROUND OF THE INVENTION

The present invention relates to a fluid-driven apparatus, such as a free-piston system, for applications including liquid rocket propulsion; particularly to a control valve assembly for fluid-driven free-piston devices, and more particularly to a valve arrangement using a plurality of valve assemblies for each reciprocating device of an associated pair of such devices so that the devices are alternately actuated by using fluid pressure communication therebetween.

Liquid rocket propulsion requirements have historically fallen into two distinct categories, which correspond to two different aerospace applications. The first kind of requirement is for performance-oriented rocket stages which deliver high levels of thrust continuously with large total impulses, typically used for launch vehicles. High performance is achieved through the use of rotating propellant pumps driven by turbines, which permits high-pressure propellant delivery from relatively lightweight tankage at low pressure. The second kind of requirement is for relatively small propulsion systems, which must reliably provide thrust on demand over periods of many years. The main application of the small systems is orbital maintenance, so performance has been much less important than long-term reliability for this second kind of propulsion system. Hence, satellite liquid propulsion systems have been pressure-fed. Advantages of avoiding pumps are overall simplicity and the lack of moving seals which could wear and permit propellant leakage losses during long periods of in operation. Perhaps more importantly, turbopumps cannot support short thrust pulses, since it requires time at reduced efficiency for turbomachinery to start and stop.

Recently, there has been interest in developing technology for increasing the performance capabilities of small rocket propulsion systems which thrust intermittently. For example, electrically-driven rotating pumps for possible use on satellites have been demonstrated. An approach for high thrust missions has been to increase the performance of pressure-fed operation, by using state-of-the-art materials technology for otherwise mass-intensive pressure vessels and high pressure liquid tankage.

An alternative small propulsion system has been demonstrated that uses low pressure tankage and free-piston pumps which can start and stop rapidly to meet a demand-thrust requirement. These pumps are driven by a gas source. Free-piston devices are positive displacement fluid power machines which undergo reciprocating motion, without mechanical power transfer, such as a connecting rod to a rotating crankshaft. Earlier applications of the free-piston devices were steam-driven air compressors, compressors driven directly by oscillating electromagnetic fields and hydraulic or gas-driven intensifiers. These prior applications generally used a relatively slow-moving differential free-piston to amplify pressure. In contrast, the free-piston pump for small propulsion systems must operate as a high volume flow device, with a high power-to-weight ratio, as well as being a pressure amplifier. U.S. Pat. No. 5,026,259, issued Jun. 25, 1991, in the name of John C. Whitehead et al., exemplifies the use of free-piston devices for propulsion systems used for attitude control or maneuvering.

While gas-driven free-piston pumps can operate at any flow rate, prior known propulsion systems using free-piston pumps have been unable to provide continuous flow of either monopropellant or bipropellant for rocket systems without complicated electrical control systems. Thus, there has existed in the small rocket propulsion systems a need for a valve control system which provides for rapid response, as well as continuous liquid delivery for steady thrust.

The present invention fills this prior recognized need by providing an improved valve control assembly which alternately actuates a pair of fluid-driven pumps, using fluid pressure communication between them. This invention is an improvement over the three-way valve arrangements of the above-referenced application Ser. No. 07/901,290, now U.S. Pat. No. 5,222,873, in that the intake-exhaust valve and the signal valve are separated, which greatly simplifies the valve assembly and provides fewer critical leakage paths, among other advantages. Each control valve of one of a pair of pumps is switched by a pressure signal depending on the state of its counterpart's pump piston. The communication logic is arranged to provide overlap of the forward strokes of the pistons, so that at least one of the pair of pumps will always be pressurized. Thus, uninterrupted pumping of liquid is made possible from a pair of free piston pumps. In addition, the speed and frequency of piston stroking is entirely dependent on the mechanical power load applied. In the case of a pair of pumps, this enables liquid delivery at a substantially constant pressure over the full range of flow rates, from zero to maximum flow.

The present invention like that described and claimed in the above-referenced has application for both monopropellant liquid propulsion systems and for bipropellant liquid propulsion systems, each utilizing reciprocating pumps. For the bipropellant system, a total of four pumps enables continuous flow of both fuel and oxidizer liquids, while allowing a different flow rate of each of the different liquids utilized.

SUMMARY OF THE INVENTION

It is an object of the present invention to provide an improved valve control arrangement for a reciprocating system.

A further object of the invention is to provide a pump system utilizing at least one pair of fluid-driven pumps and a control valve arrangement involving a plurality of valve assemblies whereby uninterrupted pumping of liquid is made possible.

A still further object of the invention is to provide a pressure actuated control valve assembly which is small and light weight while having a high fluid throughput capacity.

A still further object of the invention is to provide a control valve assembly wherein the signal portion thereof is separated from the intake-exhaust portion thereof.

A still further object of the invention is to provide automatically oscillating valving for a pair of cylinders which work at any pressure because no springs are used.

A still further object of the invention is to provide a liquid propulsion system using at least one pair of free-piston pumps, each pump having an improved control valve arrangement which is pressure actuated by the other pump.

Another object of the invention is to provide a fluid pressure control valve assembly having an inlet-exhaust section and a signal/control section.

Still another object of the invention is to provide a spool valve control arrangement for a fluid-driven reciprocating pump system for either monopropellant or bipropellant liquid propulsion system.

Other objects and advantages of the invention will become apparent from the following description and accompanying drawings.

Briefly, the invention involves a valve arrangement of control valve assemblies operating in pairs, each valve assembly being oppressively connected to actuate a reciprocating pump device. Each pair of control valve assemblies are interconnected to alternately actuate their associated pumps by using fluid pressure communication between the control valve assemblies. Each control valve assembly is switched by a pressure signal depending on the state of its counterparts pump piston. The control valve assembly/reciprocating pump arrangement of the present invention may be effectively utilized for both monopropellant and bipropellant liquid propulsion systems. For the bipropellant system, two pair of control valve assembly/pump arrangements are used, one for the fuel and one for the oxidizer, in which the oxidizer pump control valve assemblies may be slaved to the fuel pump control valve assemblies for synchronous operation.

BRIEF DESCRIPTION OF THE DRAWINGS

The accompanying drawings, which are incorporated into and form a part of the specification, illustrate and embodiment of the invention and, together with the written description, serve to explain the principles of the invention.

DETAILED DESCRIPTION OF THE INVENTION

The present invention is generally directed to a valving arrangement for small monopropellant or bipropellant liquid propulsion systems which use low pressure tankage and reciprocating pumps which can start and stop rapidly to meet a demand-thrust requirement. More specifically, the invention is directed to an improved valve control system for a pair of free-piston pumps which utilize valve assemblies oppressively connected to each pump and interconnected so as to have fluid pressure communication therebetween. The improved control valve arrangement of the present invention permits rapid switching between intake and exhaust of the pump, in addition to providing large cross sectional areas for the flows with a short stroke and minimal hardware mass and size.

As set forth in above-referenced application Ser. No. 07/901,290, now U.S. Pat. No. 5,222,873, in liquid rocket propulsion, pumps are needed to achieve the highest performance by pumping fuel stored at low pressure to the thrust chambers at high pressure, thus reducing structural mass by minimizing the volume of highly-pressurized parts. In a free-piston pump, there is no crankshaft from which valve-timing information can be mechanically obtained, yet for control it is necessary to actuate the intake and exhaust valving with a precise dependence on piston position. In applications, such as liquid rocket propulsion, there is a need for continuous liquid delivery capability for steady thrust, but also with immediate start and stop capability.

Thus, the present invention, which is an improvement over that described and claimed in U.S. application Ser. No. 07/901,290, now U.S. Pat. No. 5222,873, is a simpler, less expensive, means to alternatively actuate at least one pair of fluid-driven free-piston pumps or reciprocating devices, by using fluid pressure communication between them. Each free-piston pump is provided with a control valve assembly, and each control valve assembly is switched by a pressure signal depending on the state of its counterparts' piston. The communication logic between the control valve assemblies is arranged to provide overlap of the forward strokes of the pistons of the pumps, so that at least one of the pair of pumps will always be pressurized. Thus, uninterrupted pumping of liquid is made possible from a pair of free-piston pumps. In addition, the speed and frequency of piston stroking is entirely dependent on the mechanical power load applied. In the case of a pair of pumps, this enables liquid delivery at a substantially constant pressure over the full range of flow rates, from zero to maximum.

The control valve assemblies of this invention provide significant simplifications for greater reliability, longer life, less leakage, fewer parts, lower cost, and easier assembly than the three-way valve of the above-referenced copending application. This valve assembly of this invention has particular application for use with high temperature gas.

Figure 1:
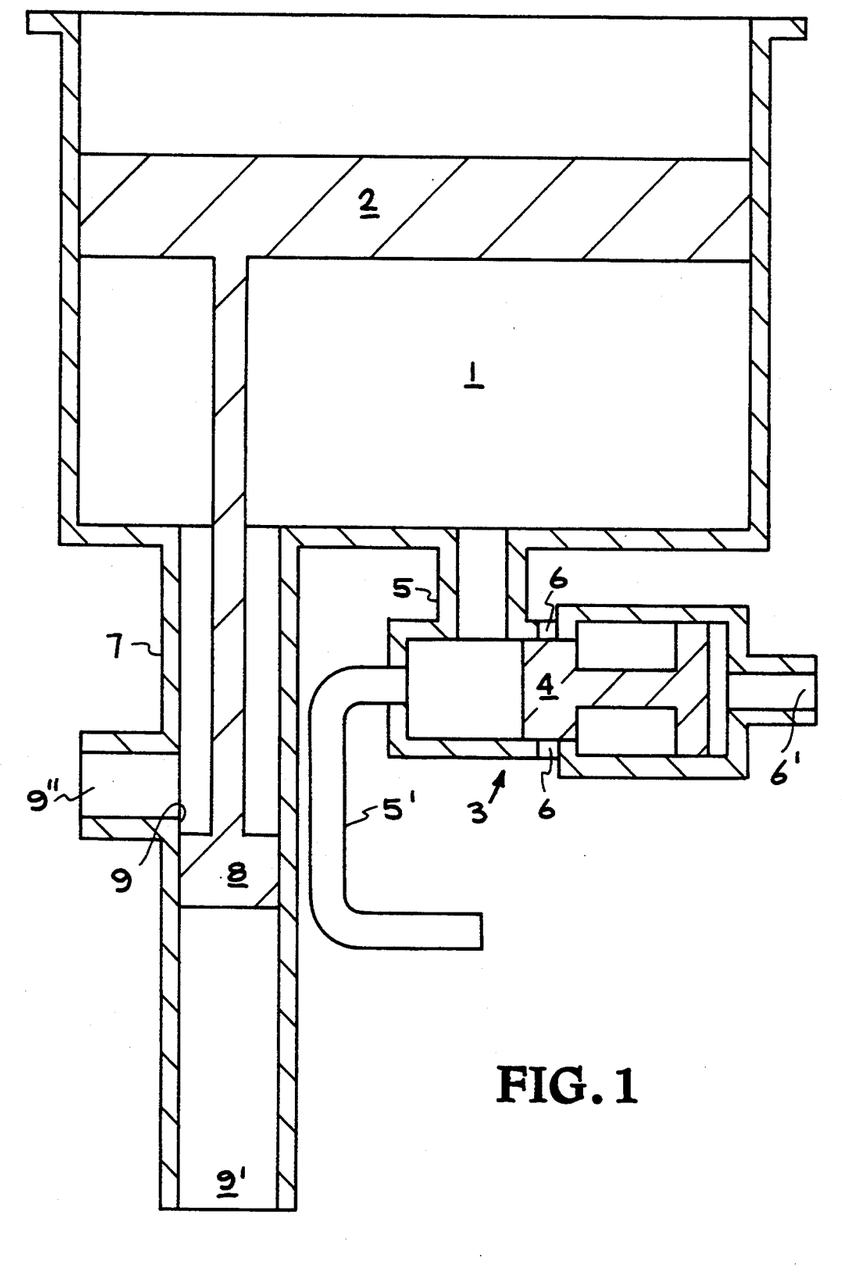
FIG. 1 schematically illustrates the basic features of the present invention.
Figure 2A:
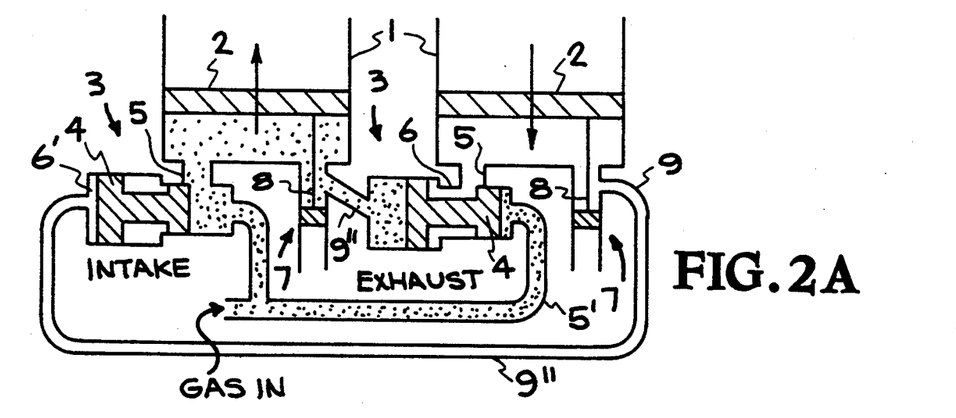
FIGS. 2A–2F schematically illustrates the pneumatic switching of the pump valves.
Figure 2B:
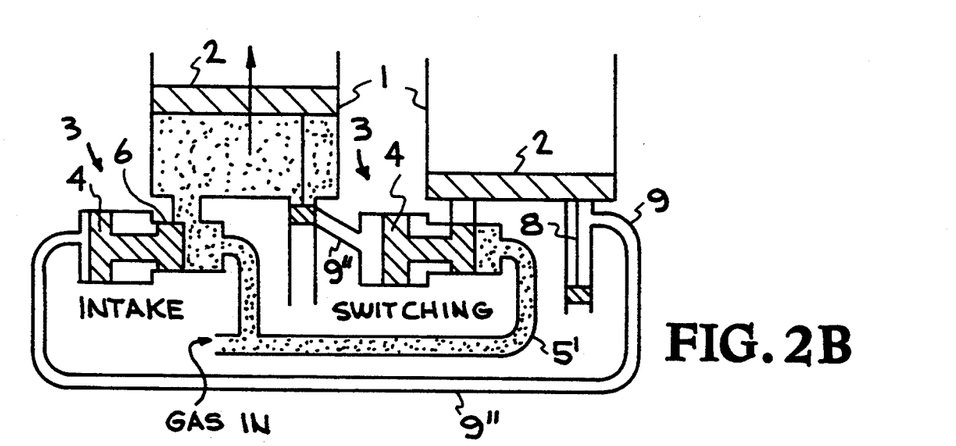
Figure 2C:
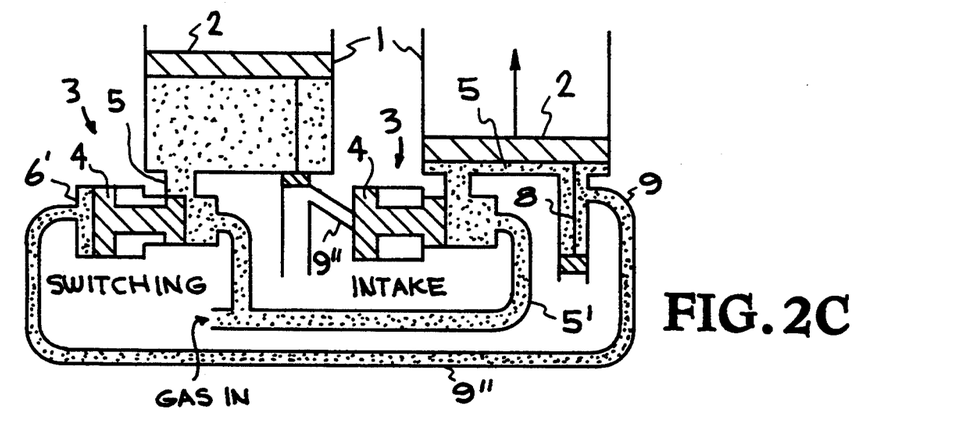
Figure 2D:
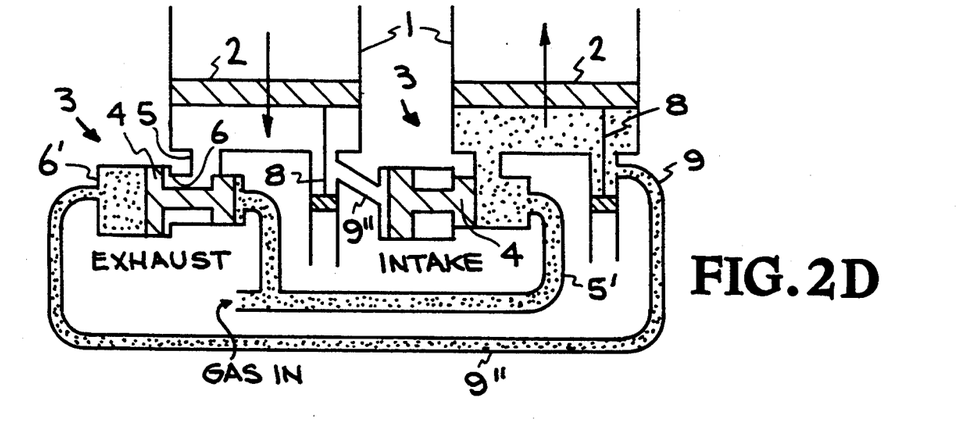
Figure 2E:
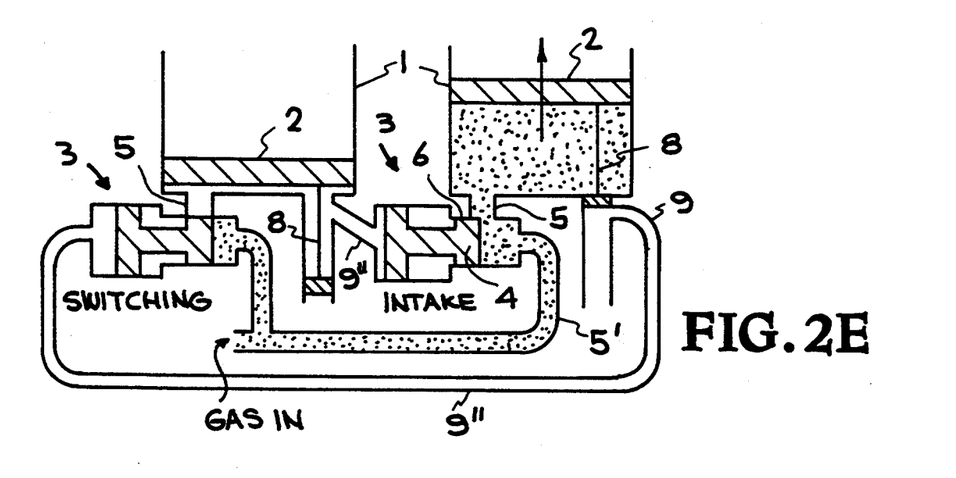
Figure 2F:
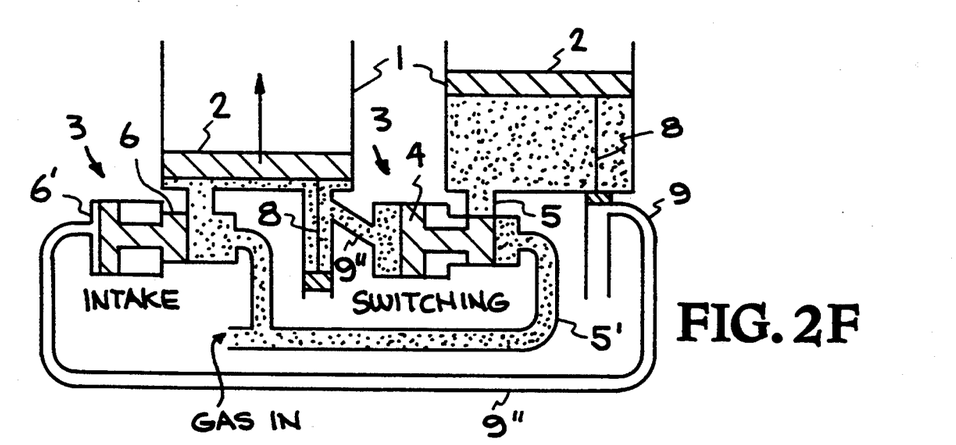

Referring now to the drawings, FIG. 1 schematically illustrates the basic features of the present invention. Apparatus of FIG. 1 comprises a cylinder 1 defining therein a working chamber within which is a partition, free-piston, or movable member 2. Connected to the cylinder 1 is a intake/exhaust control valve assembly generally indicated at 3 having therein a double-headed pressure actuated piston 4 which uncovers/covers a common intake/exhaust port 5 and exhaust ports 6.

Also connected to cylinder 1 is a signal valve assembly 7 having a piston 8 connected to movable member 2, piston 8 covering or uncovering a signal port 9 depending on the location of movable member 2 within cylinder 1. Signal valve assembly 7 also includes a signal vent port 9'. Connected to valve assembly 3 on the side thereof adjacent intake port 5 is an intake line 5' connected to a supply fluid source, not shown, while a control line 6' is connected on the side of valve assembly 3 adjacent exhaust ports 6 and is connected to a control fluid source, not shown. Connected to signal port 9 is a signal output line 9".

With the pistons 4 and 8 of respective valve assemblies 3 and 7 positioned as shown in FIG. 1, supply fluid via line 5' is directed into the working chamber of cylinder 1 moving the member 2 inwardly (toward the top as shown), and the signal line 9" is in open communication with the chamber of cylinder 1. As the member 2 continues to move inwardly in cylinder 1, piston 8 of signal valve assembly 7 passes port 9 and connects signal line 9" with signal vent 9'. While not shown, signal line 9" of one of a pair of apparatus illustrated in FIG. 1 is connected to control line 6' of another of a pair of pump/valve assemblies (not shown), and vice-versa. Thus, when the signal line 9" is vented, the pressurized signal line 9" of the companion apparatus is connected to control line 6', whereby piston 4 is moved (to the left as shown) past intake port 5 such that fluid from the chamber of cylinder 1 is exhausted via ports 5 and 6, thereby allowing movable member 2 to return or move outward (move toward the bottom as shown). Outward movement of member 2 causes signal piston 8 to move outward, thus reconnecting signal line 9 with the chamber of cylinder 1.

The essence of the switch logic basically described above with respect to FIG. 1 and described in greater detail hereinafter with respect to FIGS. 2A–F, includes the following features:

1. Supply fluid enters the working chamber in absence of control pressure.
2. Control pressure causes the working chamber to be vented.
3. Signal output line is connected to the working chamber when the chamber is not full.
4. Signal output line is vented when the working chamber is nearly full.
5. Paired apparatus having the above features with the signal output line of each one connected to the control line or port of the other.
6. Apparatus will oscillate at any supply pressure due to absence of springs (which restrict operation to particular forces and pressure levels), since operation over a wide pressure range is important for bootstrapping in a propulsion system. Bootstrapping refers to the creation of a higher pressure from a lower pressure when a pump-fed rocket initially starts, without a stored high pressure source.

While the upper or inward end of cylinder 1 of FIG. 1 is shown as being open, it can be connected to inlet and outlet check valves, such as shown in FIG. 2 of application Ser. No. 07/901,290, now U.S. Pat. No. 5,222,873, for pumping applications, or to a plenum for pressurizing same. Also, the partition or movable member 2 of FIG. 1 may be connected to an oscillating mechanism, whereby a pair of such apparatus would alternately oscillate the mechanism.

For passive demand-thrust operation of a propulsion system after startup, the valve assemblies must operate so that at least one pump assembly is pressurized and ready to deliver liquid whenever a thrust control valve is opened. Therefore, the warm gas intake ports of the valve assemblies must open alternately with positive overlap. A pump assembly which is nearing the end of its stroke should be exhausted just after the other's intake opens, so it can refill immediately. These conditions are in Table I.

TABLE I

PUMP/VALVE CONTROL LOGIC

| Condition of First Pump | | Desired State of Second Pump |
|---|---|---|
| 1. begin pumping | (pressurized) | open exhaust |
| 2. stroking forward | (pressurized) | hold exhaust open |
| 3. near full stroke | (pressurized) | open intake |
| 4. refilling | (vented) | hold intake open |

As seen from Table I, during the first, second and fourth conditions listed, the first and second pump assemblies have opposite states of pressurization. Therefore, the pneumatic signal lines connecting the two-valve assemblies are arranged so that pressure in a pump assembly's gas cylinder simply pushes the other pump assembly's signal piston into the exhaust position. However, to accommodate the third condition in Table I, this pressure signal is shut off when the pump assembly's piston is near the end of its forward stroke. The pneumatic switching sequences is illustrated in FIGS. 2A–2F in which the sequence of operation is illustrated by the steps or stages A through F of FIGS. 2A–2F. Corresponding reference numerals to those of FIG. 1 are used in FIGS. 2A–2F.

Referring now to the specific embodiment of the invention illustrated in FIGS. 3–10. The control valve assembly of this invention differs from the three-way valve assembly in above-identified copending application Ser. No. 07/901,290, now U.S. Pat. No. 5,222,873, in that the signal section thereof is separate from the intake/exhaust section. The control valve assembly of the present invention compared to the above-referenced three-way valve has fewer parts, is cheaper to manufacture, has fewer critical leakage paths, and has a more robust operation with longer lifetime. Thus, by eliminating the co-axial concentric arrangement of the above-referenced three-way valve assembly, significant simplification has resulted without adverse effect on the overall pumping or propulsion system in which the valve assembly is utilized.

Figure 3:
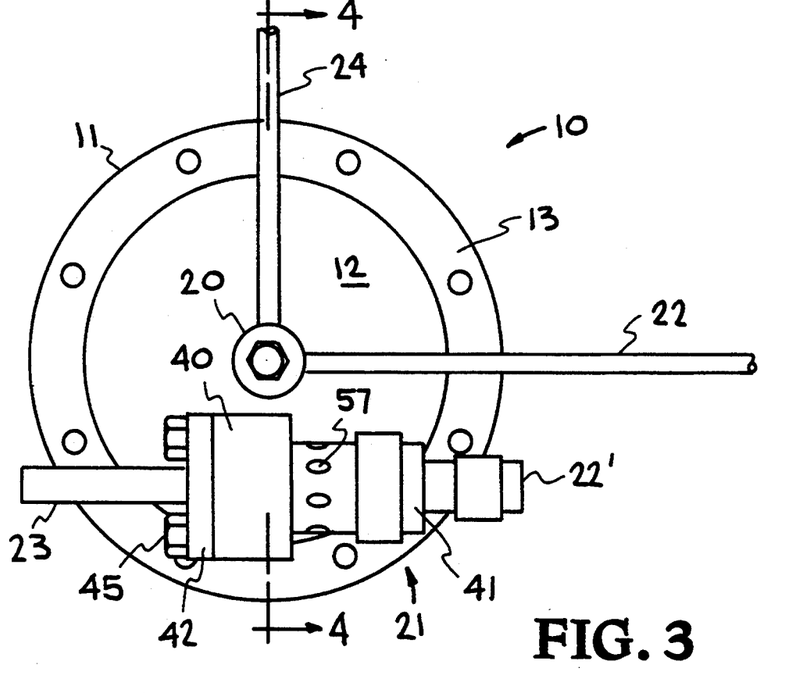
FIG. 3 is an end view of an embodiment of a control valve assembly of the invention mounted on a free piston pump.
Figure 4:
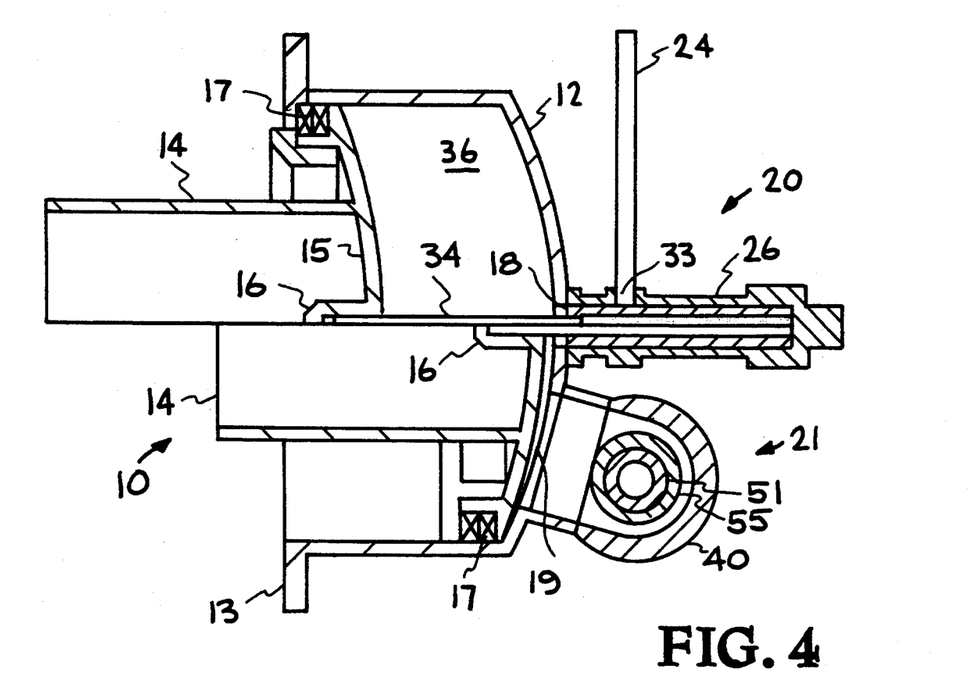
FIG. 4 is a cross-sectional view of FIG. 3 taken along the line 4—4 of FIG. 3, and with the signal valve rod and piston split to show its activated and inactivated position.

As shown in FIGS. 3 and 4, a free-piston type pump, generally indicated at 10, includes a cylinder 11 having a curved head 12 at one end and an outwardly extending flange 13 at the opposite end, and within which is a piston 14 having a head 15 with a central indented section 16, and a seal assembly 17 positioned around the periphery of the head 15. The piston 14 of pump 10 is shown in FIG. 4 in a split configuration to illustrate it in its limits of stroke (pressurized and non-pressurized) locations within cylinder 11. The cylinder 11 may be connected via flange 13 to a fluid pumping system in which a fluid is pumped via the side of the piston 14 opposite the head 12 and connected to a fluid source via appropriate intake and exhaust valves, such as illustrated in FIG. 2 of above-referenced application Ser. No. 07/901,290, now U.S. Pat. No. 5,222,873. While only one pump 10 is illustrated in FIGS. 3 and 4, it is to be understood that the invention involves the use of at least one pair of such pumps, wherein the control valve assembly of each pump controls the operation of the other pump of that pair.

As shown in FIGS. 3 and 4, the head 12 of pump cylinder 11 is provided with a central opening 18 and a larger opening 19 to which is respectively mounted a signal valve 20 and an intake/exhaust valve 21. The valves 20 and 21 correspond to the valves 7 and 3 of the FIG. 1 and FIGS. 2A-2F schematic illustrations, with signal valve 20 being connected to a signal line 22 (line 9′ of FIGS. 2A-2F), and intake/exhaust valve 21 being connected to a fluid (hot gas) supply line 23 (line 5′ of FIG. 2A-2F). Also, signal valve 20 is provided with an auxilliary signal line 24 which may be connected to a slave, if used, and connected to an exhaust port thereof (port 9″ of FIG. 1). A signal line 22′ shown in FIG. 3 interconnects valve 21 with a valve identical to signal valve 20 mounted on the other pump/valve assembly of the pair, as seen in FIGS. 2A-2F, such that pressure in one pump/valve assembly controls the other pump/valve assembly.

Figure 5:
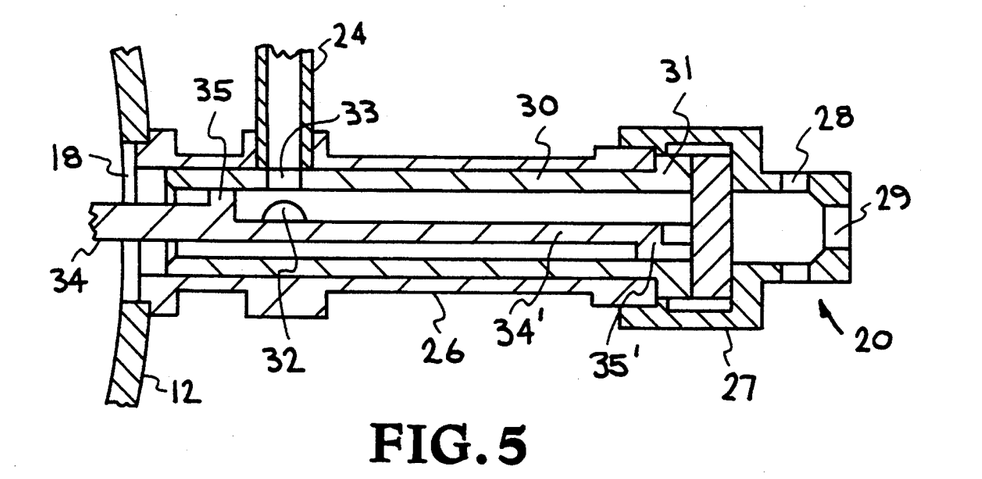
FIG. 5 is an enlarged view of the signal valve of the apparatus illustrated in FIGS. 3 and 4, and with the signal valve rod split as in FIG. 4.
Figure 6:
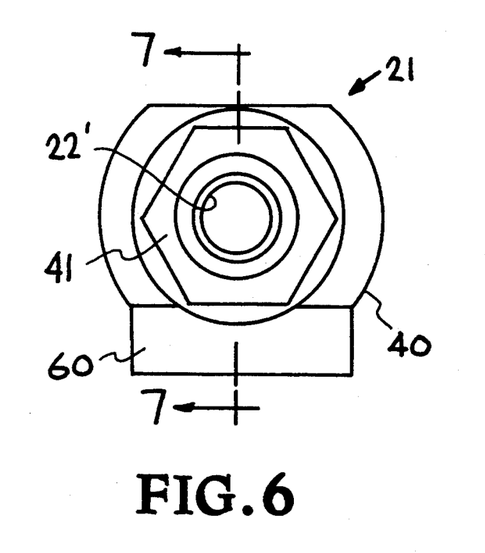
FIGS. 6 and 8 are end views of the intake-exhaust valve of the FIG. 3 apparatus.

FIG. 5 is an enlarged view of the signal valve 20, with the signal rod shown in split (limits of stroke) positions, and includes a body 26 mounted in opening 18 of cylinder head 12 and provided with an end cap 27 having a plurality of lock wire openings 28 and a vent port 29. The lock wire openings may be omitted, but also serve as vent ports. A sleeve 30 is positioned within body 26 and includes an enlarged end section 31 located within end cap 27, with sleeve 30 having a plurality of openings 32 which align with openings 33 in body 26 to which lines 22 and 24 are connected. A rod 34 (element 8 of FIGS. 2A-2F) is located within sleeve 30 and having one end secured in indented or recessed section 16 of piston head 15. Rod 34 is provided with a land or protruding section 35 and as rod 34 is moved by piston 14 the land 35 connects or disconnects fluid flow between a region 36 within cylinder 11 and signal lines 22 or the exhaust port 29. Rod 34 is shown split such that when cylinder 12 is pressured, the land of rod 34 is in the location indicated at 35 (left end of valve 20) cylinder 12 is and when in the unpressured condition the land of rod 34′ is in the location indicated at 35′ (right end of valve 20), as seen in FIG. 5.

Figure 7:
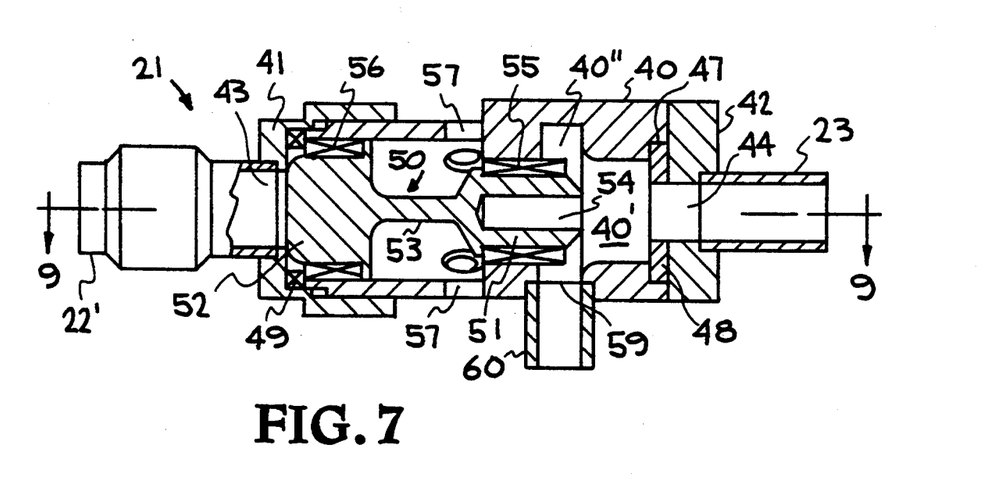
FIG. 7 is a cross-sectional view taken along line 7—7 of FIG. 6 with the valve in its intake position.
Figure 8:
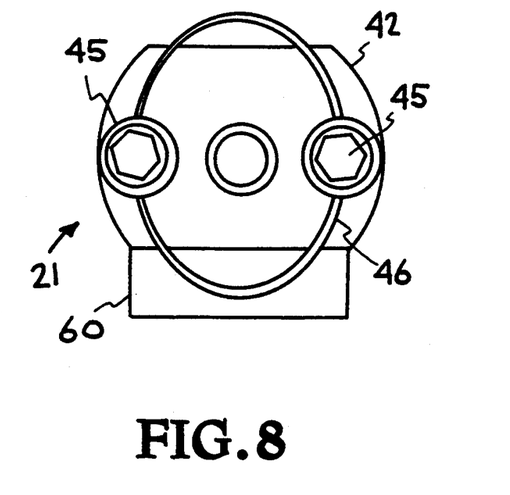
Figure 9:
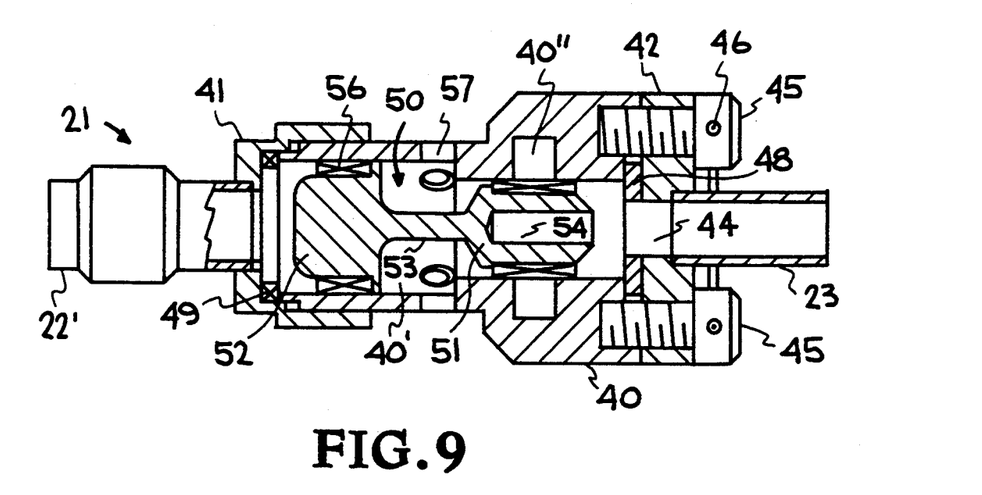
FIGS. 9 and 10 are cross-sectional views taken along line 9—9 of FIG. 7 and illustrate the switching and exhaust position of the valve of FIG. 7.
Figure 10:
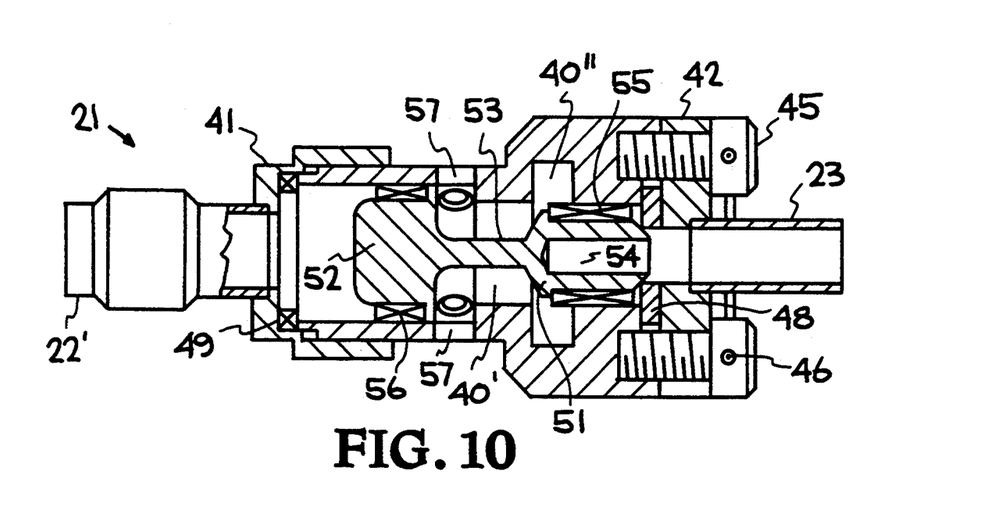

FIGS. 6-10 illustrate the components of the intake/exhaust valve 21 of FIGS. 3 and 4, which corresponds to the valve assembly 3 of FIGS. 2A-2F, with FIGS. 7, 9 and 10 illustrating the intake, switching and exhaust positions of valve 21. Valve 21 comprises a valve body 40 having a cavity 40′ extending therethrough, and with a pilot or signal end cap 41 and an intake end cap 42 secured to opposite ends of body 40. End cap 41 is provided with an opening or aperture 43 to which signal line 22′ is connected, while end cap 42 is provided with an opening or aperture 44 to which intake or supply line 23 is connected. As seen in FIGS. 8 and 9 the intake end cap 42 is secured to body 40 by screws or bolts 45 through which a wire 46 extends to maintain the screws 45 in place. Body 40 is provided with a groove or cutaway 47 at the end adjacent end cap 42 and in which is retained a poppet seat 48 having an opening therein which aligns with opening 44 of end cap 42. Located between end cap 41 and the adjacent end of body 40 is a static seal 49. A piston or spool 50 is movably located within cavity 40′ of body 40 and includes a pair of head sections 51 and 52 interconnected by a reduced diameter section 53, with head section 51 having a countersink 54 therein to reduce weight. A poppet seal 55 is secured around the exterior of piston head 51 and a pilot or signal seal 56 is secured around the exterior of piston head 52. Valve body 40 is provided with a plurality of holes or apertures 57 located in spaced relation therearound (also shown in FIG. 3), and provided with an enlarged diameter section of cavity 40′ indicated at 40″ in which is located an enlarged opening or slot 59. Connected to valve body 40 via enlarged opening 59, as seen in FIG. 7, is a member 60 which is mounted on cylinder head 12 around opening 19, as shown in FIG. 4, whereby fluid is directed through valve 21 into or exhausted from the region 36 within cylinder 11.

In operation of the valve 21, FIG. 7 illustrates the valve in its intake position, wherein signal fluid via line 22′ from an associated valve assembly of the pair is cut-off as being in exhaust position wherein fluid (hot gas) from an external source is directed through line 23 against head 51 of piston or spool 50 causing the piston to move to the left end of cavity 40′ as shown, thereby directing fluid through enlarged cavity 40″, opening 59 and member 60 into the region 36 of cylinder 11 causing piston 14 to move to the left (start of piston stroke) as shown in the upper section of FIG. 4 which causes rod 34 of signal valve 20 to move to the left (into cylinder region 36).

FIG. 9 illustrates the valve 21 in its switching position, between intake and exhaust positions, and such is produced by signal fluid from the associated valve being directed through line 22′ onto head 52 of piston or spool 50 causing same to move in cavity 40′ toward the right end of the cavity as shown. By such movement of piston, the piston head 51 blocks passage of fluid from line 23 into enlarged cavity 40″ thereby cutting of fluid flow into region 36 of cylinder 11 stopping further movement of piston 14 to the left (end of piston stroke), as well as the movement of rod 34 of signal valve 20 to the left. Signal fluid via line 22′ continues to move the piston 50 of valve 21 into the right end of cavity 40′ shown in FIG. 10, thereby allowing fluid to pass from region 36 of cylinder 11 through member 60, opening 59 enlarged cavity 40″, port 40′ and out through exhaust ports or holes 57. This allows piston 14 to move to the right as shown in FIG. 4, causing signal valve rod 34′ to move to the right within valve 20.

To enable an understanding of the operation of valves 20 and 21, which operate in pairs when mounted on pump assemblies, attention is again directed to FIGS. 2A-2F. The operation of the various components of the valves 20 and 21 can be readily seen by indicating which component of the valves are the equivalent of the components illustrated in FIGS. 1 and 2A-2F. In FIG. 1, the signal valve assembly 7 which includes components 8, 9, 9′ and 9″ correspond to components in valve 20 wherein rod 34 (34′) with lands 35 (35′) (component 8), port 33 and signal lines 22 and 24 (components 9 and 9″), and exhaust port 29 (component 9′) correspond. As to intake/exhaust valve 3 of FIG. 1, similar components of valve 21 are: piston or spool 50 (spool 4), intake line 23 (line 5′), member 60 (intake port 5), ports 57 (exhaust ports 6), and signal port 22′ (line 6′).

It has thus been shown that the present invention provides a simplified control valve arrangement which is particularly adapted for systems using fluid-driven pumps, with the pump/valve assembly being operable in pairs wherein the control valve assembly of one pump/valve assembly is switched by a pressure signal depending on the state of the piston of the other pump/valve assembly. Also, it has been shown how the present invention is applicable to liquid and bi-liquid applications, such as those using either free-piston or bellows type pumps, so as to provide continuous liquid pumping of both liquids, as well as providing a modification for one of the liquid pumps.

While the invention has been described primarily in monopropellant and bipropellant liquid propulsion systems, it is not intended to limit the use of the invention to these particular systems. The invention can be utilized for various liquid and gas systems particularly those requiring storage at a low pressure and requiring a higher pressure at the point of use, as well as for pressurizing a plenum or operating an oscillating mechanism. Also, for certain applications diaphragm type pumps can be utilized.

While a particular embodiment of the invention have been described and illustrated, such is not intended to limit the invention, since other embodiments and applications will become apparent to those skilled in the art. The invention is intended to be limited only by the scope of the appended.

I claim:

1. In a system for providing either an on demand supply or a continuous supply of fluid to a point of use, the improvement comprising:
   at least one pair of fluid-driven pump assemblies;
   each of said pump assemblies including at least a fluid cylinder, and a piston located in said fluid cylinder;
   two valve assemblies operatively connected to each of said pair of pump assemblies, each of said two valve assemblies being operatively connected to only a section of said fluid cylinder located on one side of said piston of one of said pump assemblies;
   said two valve assemblies of each of said pair of pump assemblies including means for directing fluid into said section of said fluid cylinder of a pump assembly and for exhausting fluid from said section of said fluid cylinder of said pump assembly, signal means attached to said piston of said pump assembly, and means for activating said fluid directing and exhausting means; and
   means interconnecting said signal means and said activating means of an associated valve assembly of an associated pump assembly;
   whereby each of said valve assemblies of an associated pair of pump assemblies is activated by the location of said piston and the state of pressurization of a pump assembly operatively connected to the other of said valve assemblies of such an associated pair of pump assemblies.

2. The improvement of claim 1, wherein each of said pump assemblies includes a piston having a head;
   said piston head being located in said section of said fluid cylinder; and
   said signal means of said associated set of valve assemblies being connected to said piston head.

3. The improvement of claim 2, wherein said piston head includes an outwardly curved end section having a recess therein, and said signal means being in said recess of said piston head.

4. The improvement of claim 3, wherein said fluid cylinder is provided with a curved head having a pair of openings therein, and wherein a set of said valve assemblies is mounted on said pair of openings in said cylinder head.

5. The improvement of claim 1, wherein said means for directing fluid into said section of said fluid cylinder of a pump assembly and for exhausting fluid from said section of said fluid cylinder comprises:
   a first valve assembly of a set of said valve assemblies having a section constructed to cooperate with an opening in a head of said fluid cylinder;
   a second valve assembly of said set having a section constructed to cooperate with another opening in said head of said fluid cylinder;
   said signal means including a member extending through said another opening in said cylinder head and attached to said piston.

6. The improvement of claim 5, wherein said member of signal means, connected to said piston and said extending through another opening in said cylinder head comprises:
   a rod connected at one end to said piston;
   said rod being provided with a land located on an opposite end thereof; and
   wherein said signal means includes a valve body provided with a central opening therein and within which said rod extends;
   said valve body being provided with a plurality of openings in a wall thereof, and wherein said land on said rod is adapted to cover and uncover at least one of said plurality of openings.

7. The improvement of claim 6, wherein said valve body includes an end cap secured to an outer end thereof, said end cap having at least a vent hole therein.

8. In a liquid pumping system, the improvement comprising:
   a pair of fluid-driven reciprocating pump assemblies, each including a fluid cylinder having a piston-like member therein defining a section of said fluid cylinder; and
   a fluid activated valve assembly and a signal valve assembly each operatively connected to only said section of said fluid cylinder of each of said pump assemblies;
   said valve assemblies on each of said pump assemblies being interconnected such that stroking of said piston-like member of one of the pair of pump assemblies causes activation of a fluid activated valve assembly connected to the other of the pair of pump assemblies;
   each of said signal valve assemblies being connected to said piston-like member located in said fluid cylinder of said pump assembly on which said signal valve assembly is mounted;
   whereby stroking of said piston-like member in said section of said fluid cylinder of one of said pump assemblies activates said signal valve assemblies, which activates said fluid activated valve assembly of the other of said pump assemblies.

9. The improvement of claim 8, wherein each of said fluid activated valve assemblies comprises a three-way valve;
   said three-way valve includes valve body, a moveable valve member located within said valve body;
   said moveable valve member having a pair of spaced piston sections.

10. The improvement of claim 9, wherein said piston sections of said moveable valve member is provided with a seal extending therearound, and a pair of end caps secured to said valve body and having an opening therein, said valve body having a plurality of spaced openings therein, and an enlarged cavity section in which is located an opening extending through said valve body, said opening being connected to one of said reciprocating pump assemblies.

11. The improvement of claim 10, wherein each of said signal valve assemblies comprises:
- a hollow valve body having one end secured to a cylinder of one of said pump assemblies;
- an end cap secured to an opposite end of said valve body;
- said valve body having a plurality of spaced apertures in wall surfaces thereof; and
- a rod means extending into said hollow valve body and having one end thereof secured to a piston located within said cylinder of said one of said pump assemblies;
- said rod means including at least one land thereon which is adapted to cover and uncover at least one of said apertures in the wall surfaces of said valve body as said piston of said one pump assembly moves within said cylinder of that pump assembly.

12. The improvement of claim 11, wherein said signal valve assembly of one pump assembly of said pair of pump assemblies is connected via a fluid line to said fluid activated valve assembly of another pump assembly of said pair of pump assemblies.

13. The improvement of claim 12, wherein one of said apertures in said valve body of said signal valve assembly of said one pump assembly is connected to said line connected to said valve body of said fluid activated valve assembly of said another pump assembly such that fluid directed through said line from said signal valve assembly causes movement of said moveable valve member of said fluid activated valve assembly of said another pump assembly.

14. A valve arrangement adapted to be connected to a fluid under pressure and to a section of a cylinder having a moveable member therein for pressurizing or exhausting only that section of the cylinder, comprising:
- a first valve having a moveable valve member therein; and
- a second valve having a moveable valve member therein;
- said first valve being adapted to be connected to a fluid under pressure, and adapted to be connected to a section of an associated cylinder having a moveable member therein, said first valve having a body with exhaust openings therein and said moveable valve member thereof being located in said valve body so as to cover and uncover said exhaust openings upon movement thereof;
- said moveable valve member of said second valve being adapted to be connected to one side of a moveable member defining such a section in such an associated cylinder, and said second valve being connected to said valve body of said first valve so as to direct a signal fluid against said moveable valve member of said first valve;
- whereby fluid under pressure is directed into such a section of such an associated cylinder for moving a moveable member therein in a first direction and for exhausting fluid from the same section of such an associated cylinder for allowing a moveable member therein to move in an opposite direction.

15. The valve arrangement of claim 14, wherein said valve body member of said first valve has a central opening extending therethrough with different diameter sections in said central opening;
- said valve body having a plurality of apertures through wall surfaces thereof in commutation with at least two of said different diameter sections of said central opening;
- said valve body being provided at each end with end caps having apertures therein, a first of said end caps being adapted to be connected to such a fluid under pressure, a second of said end caps being adapted to be connected to receive signal fluid for moving said moveable valve member in said valve body; and
- wherein said moveable valve member of said first valve includes a pair of head sections interconnected by a reduced diameter section, each of said head sections being constructed and moveably positioned within said valve body so as to cover or uncover said apertures in said end caps;
- one of said head sections of said moveable valve member being constructed and moveably positioned within said valve body so as to cover or uncover apertures in a larger diameter section of said central opening in said valve body.

16. The valve arrangement of claim 15, wherein said one of said head sections of said moveable valve member is constructed and moveably positioned to cover and uncover said aperture in said first of said end caps for controlling flow of fluid under pressure through said valve body, and for controlling flow of fluid under pressure into and from an associated cylinder; and
- wherein another of said head sections of said moveable valve member is constructed and moveably positioned to cover and uncover said aperture in said second of said end caps for movement thereof by signal fluid directed through said aperture in said second of said end caps.

17. The valve arrangement of claim 15, wherein each of said head sections of said moveable valve member is provided with a sealing means extending around at least a portion of said head sections.

18. The valve arrangement of claim 15, additionally including a member forming a seat for one of said head sections of said moveable valve member and positioned intermediate one of said end caps and said valve body.

19. The valve arrangement of claim 14, wherein said second valve includes a hollow valve body with spaced apertures therein and an end cap secured to one end thereof;
- said moveable valve member of said second valve extending into an opposite end of said valve body;
- said moveable valve member having at least one land thereon constructed and moveably positioned to cover at least one of said apertures in said valve body; and
- said at least one aperture of said valve body being connected to said valve body of said first valve for directing a signal fluid against said moveable valve member of said first valve.

* * * * *